United States Patent [19]
Hautcoeur et al.

[11] Patent Number: 5,640,217
[45] Date of Patent: Jun. 17, 1997

[54] EYEGLASS FRAME WITH VERY HIGH RECOVERABLE DEFORMABILITY

[75] Inventors: Alain Hautcoeur, Montigny-les-Metz; André Eberhardt, Metz, both of France

[73] Assignee: Fergaflex, Inc., Montreal, Canada

[21] Appl. No.: 592,099

[22] Filed: Jan. 26, 1996

[30] Foreign Application Priority Data

Feb. 2, 1995 [FR] France ................... 95 01409

[51] Int. Cl.⁶ .................................................... G02C 1/00
[52] U.S. Cl. ........................... 351/41; 351/111; 351/124
[58] Field of Search .................. 351/41, 158, 111, 351/124, 125

[56]  References Cited

U.S. PATENT DOCUMENTS

| | | | |
|---|---|---|---|
| 4,494,833 | 1/1985 | Takamura et al. | 351/41 |
| 4,757,978 | 7/1988 | Hodgson | 266/262 |
| 4,758,285 | 7/1988 | Hodgson et al. | 266/262 |
| 4,772,112 | 9/1988 | Zider et al. | 351/41 |
| 4,895,438 | 1/1990 | Zider et al. | 351/41 |
| 4,896,955 | 1/1990 | Zider et al. | 351/41 |

*Primary Examiner*—Hung X. Dang
*Attorney, Agent, or Firm*—McGlew and Tuttle

[57] ABSTRACT

An eyeglass frame wherein one of the components such as the temples, the bridge and/or the connection bar between the eyewires is made of a shaped memory alloy which is able to regain its initial shape by simple heating after having undergone a permanent deformation and a lower temperature.

21 Claims, 2 Drawing Sheets

EYEGLASS FRAME WITH VERY HIGH RECOVERABLE DEFORMABILITY

FIELD OF THE INVENTION

The present invention pertains to an eyeglass frame containing at least some metallic components such as the temples, the bridge and/or the connection bar between the eyewires holding the vision correction lenses, sunglass lenses or safety lenses or directly between the lenses.

BACKGROUND OF THE INVENTION

The use of shape memory alloys for making certain components of metallic eyeglass frames has already been known.

Any metal alloy that is able to regain its initial shape by simple heating after having undergone a permanent deformation at a lower temperature is called a shape memory alloy (SMA).

This property is the macroscopic expression of a physical phenomenon involved in the atomic organization of the material. This transformation is known as the reversible martensitic transformation.

The martensitic transformation can be described, from a phenomenological viewpoint, by the curve shown in FIG. 1, in which the temperature is shown on the abscissa and the transformed fraction is shown on the ordinate.

On cooling (direct martensitic transformation), martensite begins to be formed beginning from the temperature Ms (martensite start), and the sample is completely martensitic at the temperature Mf (martensite finish).

On reheating (inverse transformation), austenite (or β phase) begins to be formed at a temperature As (austenite start), and the sample is completely austenitic at the temperature Af (austenite finish.

The reversible martensitic transformation is the cause of the specific properties of the shape memory alloys:
one-way memory effect,
two-way memory effect,
superelastic effect,
rubber effect.

The martensitic transformation takes place not only in the case of T<Ms, but also at T>Ms by the application of a mechanical stress. If this stress is released for an alloy deformed at T>Af, inverse transformation of the martensite into austenite takes place with a transformation hysteresis. This recoverable phenomenon is called the superelastic effect. It is illustrated in FIG. 2, in which the deformation is shown on the abscissa and the mechanical stress is shown on the ordinate.

The deformation $\epsilon_{max}$ is the maximum deformation $\epsilon$ which a shape memory alloy is able to withstand without irreversible plastic deformation persisting after the shape memory alloy is relieved of any mechanical stress.

The standard NF A 51-080 defines the terminology and the measurements associated with the shape memory alloys. The terms used in this text refer to that standard. The standard can be obtained from AFNOR (Association Francaise de Noralisation), Tour Europe, Cedex 7, 92080 Paris La Défense, France.

There currently are eyeglass frames containing temples, bridges or bars in which all or part of these components are made of a superelastic shape memory alloy. The shape memory alloy used to prepare these components is an alloy based on titanium and nickel. This results in the following considerable difficulties, inter alia, in terms of the preparation and the mechanical strength of the eyeglass frames:

Low fatigue strength of the Ti—Ni alloys, which displays a fragile rupture after some stress cycles.

Work hardening may be used to palliate the poor fatigue strength of Ti—Ni alloys, but the superelastic deformation $\epsilon_{max}$ is limited to about 3% to 4% in this case. The rigidity of the Ti—Ni alloy increases rapidly beyond this limit, and the alloy tends to break.

The Ti—Ni alloys contain a high percentage of nickel and must be coated with nickel for assembly by means of silver solder which is usually used in making eyeglasses. The element nickel may cause allergies in the wearer of the eyeglass frames.

The assembly of the superelastic components made of Ti—Ni alloy with the components made of conventional metals commonly used in making eyeglasses (Monel, nickel silver, bronzes, euroberyllium, stainless steels, titanium alloys) cannot be easily performed.

Three methods are currently employed to assemble the superelastic components with the conventional components (which lack the property of superelasticity):

The first method consists of force-fitting the end or ends of the superelastic component into a socket made of a metal that can be soldered with silver. With the superelastic component being fitted into the socket, the socket is then soldered to the conventional components.

It should be noted that a galvanic nickel coating may be used to improve the coupling and the soldering.

The second method consists of coating the superelastic component with a galvanic nickel layer and subsequently soldering to the conventional component with a silver solder.

The third method consists of welding the superelastic components to the conventional components with the energy of a laser beam or electron beam. These expensive methods are, however, rarely employed in making eyeglasses.

Other shape memory alloys have also been tested for making superelastic eyeglass frame components. These tests and the patents that may have resulted therefrom mention Cu—Zn—X alloys (in which X=Al, Sn, . . . ) and Cu—Al—Ni. However, compared with the alloys based on Ti—Ni, these alloys cannot withstand $\epsilon_{max}$ deformations greater than 3% to 4%. Beyond this limit, they are fragile and break because of their coarse grain structure.

It is currently desired to improve the mechanical strength and the use of the shape memory alloys used in making eyeglasses, such as Ti—Ni as well as other shape memory alloys.

The methods used consist of hardening the material in order to increase its yield strength as much as possible.

A very fine-grain structure is desirable for this purpose; it is obtained either by recrystallization of the coarse structures generated in the foundry after considerable work hardening, or by structural hardening achieved in the course of heat treatments causing the precipitation of the hard phases, or by cold working.

The major drawback of these methods is that the deformations associated with superelasticity are greatly limited. The grain boundaries, the precipitates and the work hardening block the martensitic transformation and lead to a great increase in the rigidity of the superelastic alloy.

SUMMARY AND OBJECTS OF THE INVENTION

The object of the present invention is to provide a metallic eyeglass frame in which certain components, such as the temples, the bridges or the bars, are made of an alloy capable of undergoing deformation under the action of mechanical stresses, while completely resuming their shape once they cease to be subjected to a stress.

In addition, such components should be able to undergo a large number of bending cycles without rupture. Such components should also be able to be easily assembled with other components forming part of the eyeglass frame.

The frame to which the present invention pertains is therefore characterized in that it contains temples and/or a bridge and/or one or more bars made of a monocrystalline shape memory alloy, i.e., an alloy that is formed by a single crystallite or a plurality of crystallite separated by weakly disoriented boundaries and is selected from among the alloys based on Cu or Fe.

The use of a monocrystalline shape memory alloy is advantageous insofar as it makes it possible to benefit from the most homogeneous structure possible from a microscopic viewpoint in order to prevent any local mechanical stress concentration from appearing. The shape memory alloys are selected from among the following copper-based alloys:

Cu—Al—Cu,
Cu—Al—Ni,
Cu—Al—Be,
Cu—Al—Mn, or from among the following iron-based alloys:

Fe—Mn—Si,
Fe—Mn—Cr,
Fe—Mn—Cr—Si.

A first advantage of these alloys is that they are much less expensive than the Ti—Ni alloys commonly used. In addition, they possess clearly superior deformation characteristics, because the maximum deformation is on the order of magnitude of 11%, at least between −40° C. and +80° C., or 2 to 3 times that of a Ti—Ni alloy, without any increase in rigidity being observed, which represents a certain advantage for the person wearing the eyeglass frame in the case of an accident such as a shock.

It should be noted that the same Cu—Al—Cu, Cu—Al—Ni, Cu—Al—Be or Cu—Al—Mn and Fe—Mn—Si, Fe—Mn—Cr or Fe—Mn—Cr—Si alloys cannot be deformed by more than 3% to 4% and have a very limited fatigue strength if they have a polycrystalline structure, as opposed to the monocrystalline structure.

Under these circumstances, the frame is deformed and the eyeglass frame resumes its original geometry without residual deformation after the shock.

The fatigue properties of a component made according to the present invention are also advantageous. While a component made of a Ti—Ni alloy runs the risk of breaking after a certain number of stress cycles, the components made of a monocrystalline shape memory alloy according to the present invention are able to withstand several thousand cycles without breaking. It is consequently unnecessary to work harden such a component to confer a better fatigue strength on it. On the contrary, the work hardening of a monocrystalline alloy would run the risk of producing a change in its superelastic characteristics. The components made according to the present invention advantageously preserve their deformability properties in a broad temperature range spanning at least 120° C. For example, the monocrystalline superelastic components preserve their elastic rebound without any residual deformation in the range of −40° C. to +80° C., as opposed to the Ti—Ni alloys, whose use temperatures are between −20° C. and +40° C.

It should be noted that the alloys based on Cu—Al—Cu, Cu—Al—Ni, Cu—Al—Mn, Cu—Al—Be, and those based on Fe—Mn—Si, Fe—Mn—Cr or Fe—Mn—Cr—Si can be directly welded or soldered to the other alloys commonly used in making eyeglasses among the shape memory alloys used to prepare the components according to the present invention.

It should be noted that the silver solders can be used directly on monocrystalline shape memory copper alloys due to the absence of grain boundaries. In fact, the presence of grain boundaries during soldering is manifested by the formation of intermetallic compounds in these grain boundaries, and these compounds cause an impairment in the mechanical strength of the boundaries.

Moreover, as these monocrystalline shape memory alloys do not require work hardening or structural hardening, welding or soldering does not cause any changes in the state of the superelastic shape memory alloy, thus making it possible to use the existing equipment, whose cost of use and depreciation are lower.

It is thus possible to directly weld the components according to the present invention to the components forming part of the frame made of the metal alloys commonly used in making eyeglasses. Thus, in particular, the temples can be directly welded to the eyewires of the frame, or each temple can be provided with a torsion bar intended to be welded to an eyewire of the frame.

To facilitate bending at the temples of the frame, it is possible to reduce the thickness of the material acting as the hinges, but without using hinge components as they are commonly known in the area of eyeglass-making. One advantage of this type of articulation of the temples to the body of the frame is that it makes possible the automatic opening of the temples on removal from an eyeglass holder, which makes it possible to put on the eyeglasses with one hand only.

It is also possible to provide other zones of reduced thickness to make it possible to fold up the frame. It is possible in this case to provide zones of reduced thickness on the bridge connecting the two eyewires, on the bar possibly provided between them, as well as in the middle of each temple.

According to another feature of the present invention, a conventional thermomechanical treatment to change a behavior of the alloy from a superelastic behavior to a plastic behavior for adjustment of the temple, the bridge, and the bar. This treatment may be carried out locally at the end of each temple to change its behavior, which makes it possible to adjust it to the contour of the ear. This treatment can also be easily performed on any part of the bridges and/or of the temples of the frame.

According to another embodiment, the bridge made of monocrystalline shape memory alloy is directly attached to the lenses, and the temples made of monocrystalline shape memory alloy are attached either directly to the lenses or to the hinges, which themselves are directly attached to the lenses.

Another advantageous feature of the components according to the present invention is that they do not contain nickel in the case of the alloys other than Cu—Al—Ni, which eliminates any risk of allergy resulting from contact with an alloy containing this constituent for the wearer of the eyeglasses.

The components made of shape memory alloy according to the present invention are prepared from a wire made of monocrystalline shape memory alloy, whose cross section can be framed in a circle having a diameter of less than 4 mm. This feature permits easy shaping for preparing the components, without requiring considerable deformation resulting from a work hardening, which is harmful for the monocrystalline structure and for the resulting properties.

According to another feature of the present invention, the components are made of a monocrystalline shape memory alloy whose transformation temperature Af, beginning from which the martensite begins to be formed, is between −100° C. and −20° C.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
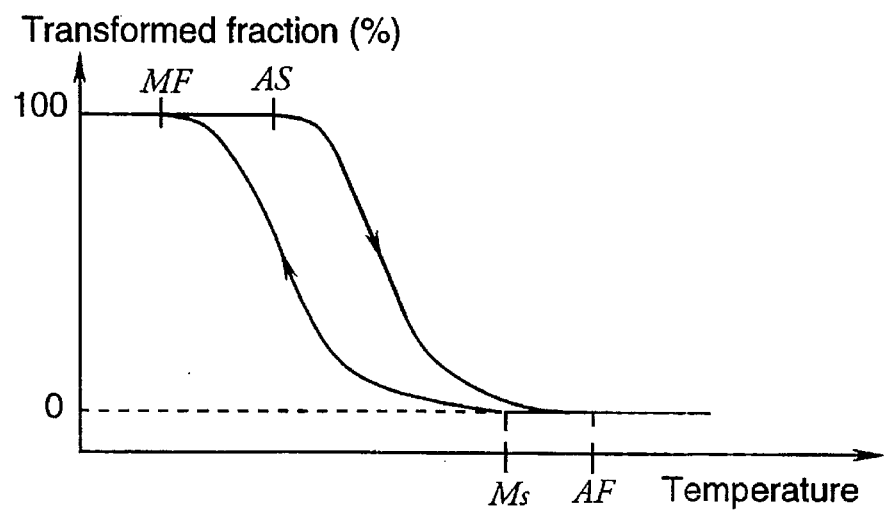
FIG. 1 is a graph of the martensitic transformation in which the temperature is shown on the abscissa and the transformed fraction is shown on the ordinate.
Figure 2:
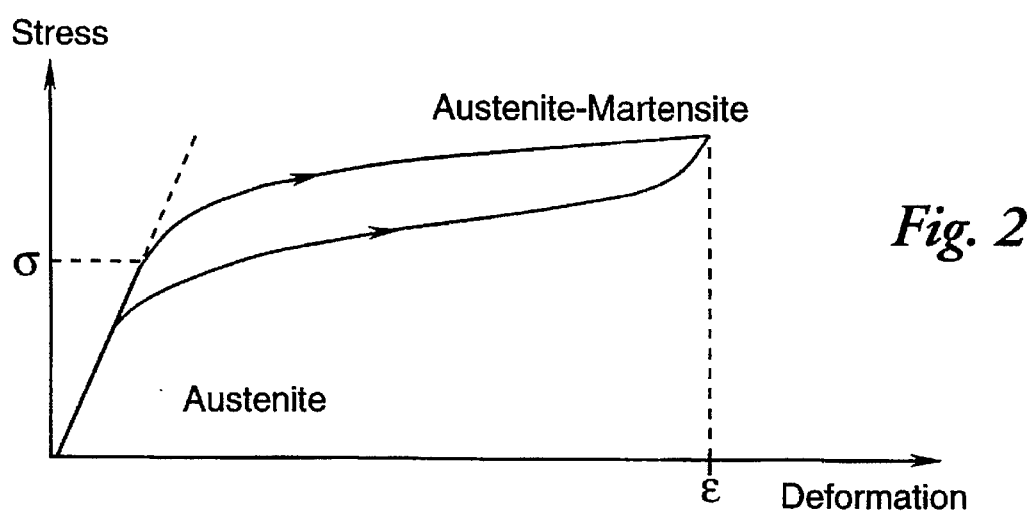
FIG. 2 is a graph of superelastic effect in which the deformation is shown on the abscissa and the mechanical stress is shown on the ordinate.
Figure 3:
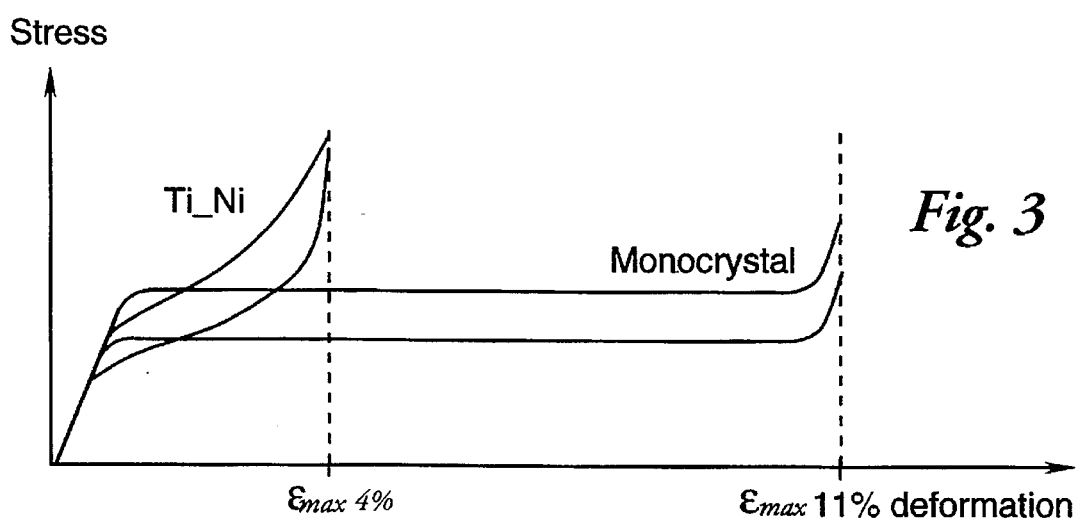
FIG. 3 is a diagram showing the deformation of a component according to the present invention as a function of the stress applied to the component.

Referring to the drawings and in particular to FIG. 3, the deformation of a component made of monocrystalline shape memory alloy according to the present invention is a function of the stress applied to it. As is shown in the left-hand part of the diagram, the elastic deformation of a component made of titanium-nickel does not exceed 4%. On the contrary, the elastic deformation of a component made of a shape memory alloy according to the present invention reaches 11%, and this value of deformation is obtained with a stress lower than that necessary for achieving the maximum deformation of the component made of titanium-nickel.

Figure 4:
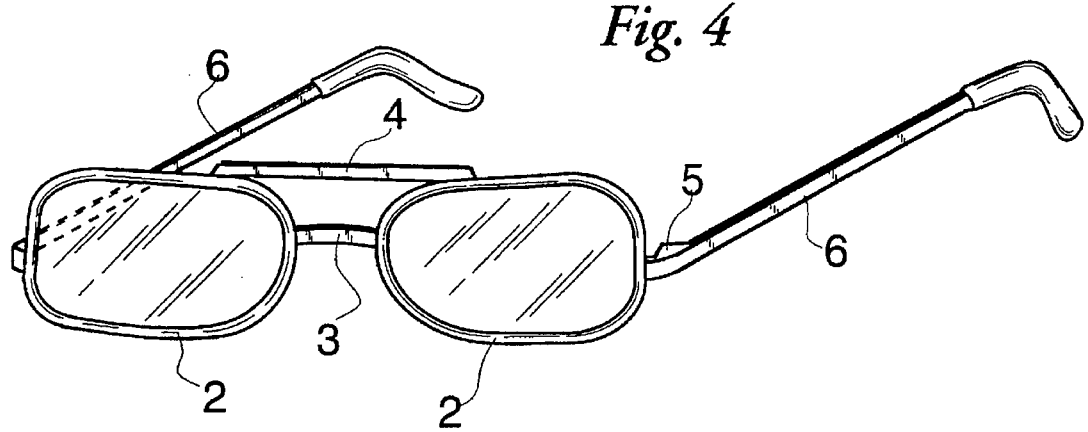
FIG. 4 is a perspective view of a pair of eyeglasses.

FIG. 4 shows a pair of eyeglasses containing two eyewires 2 intended to accommodate the lenses and connected to one another by a bridge 3 and by a bar 4. A temple 6, articulated by means of a hinge 5, is mounted on each eyewire 2. The bridge 3, the bar 4, and the temples 6 may be prepared from a monocrystalline shape memory alloy of at least one or more of Cu—Al—Cu, Cu—Al—Ni, Cu—Al—Be or Cu—Al—Mn and Fe—Mn—Si, Fe—Mn—Cr or Fe—Mn—Cr—Si alloys according to the above provisions.

Figure 5:
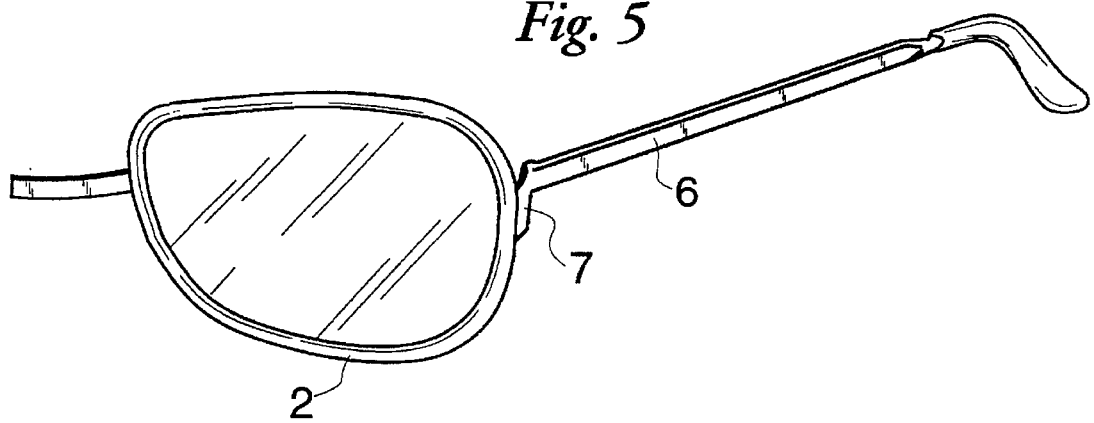
FIG. 5 is a perspective view of part of a pair of eyeglasses, showing more specifically the articulation of a temple to an eyewire.

FIG. 5 shows another embodiment in which each temple 6 is mounted on the corresponding eyewire 2 by welding, via a torsion bar 7. Consequently, there is no longer a hinge proper, as the alloy permits, considering its possibilities, the pivoting function of the temples toward the closed position to be accomplished. It would be equally possible, without using a bar 7, to provide a section of reduced material thickness facilitating bending of the temple 6 and areas in the vicinity of the end of the temple which is welded to the eyewire 2.

Figure 6:
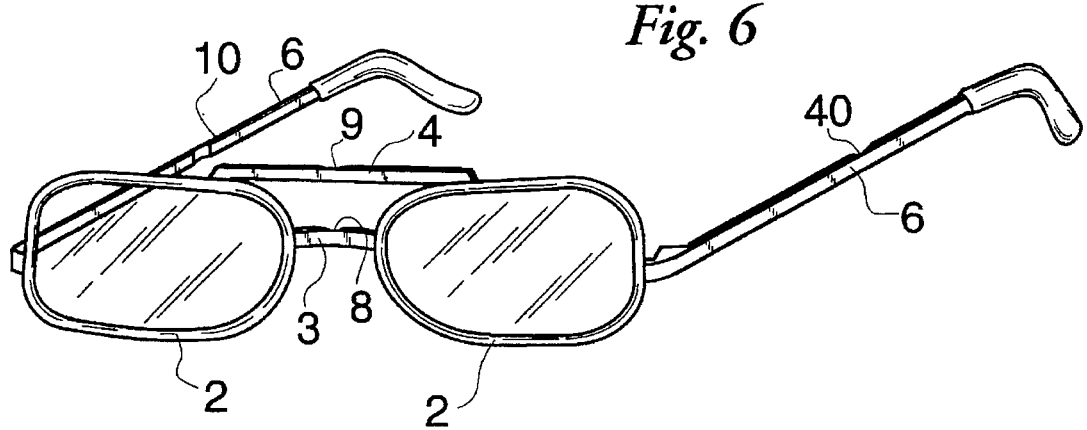
FIG. 6 is a perspective view of another pair of eyeglasses.

FIG. 6 shows another embodiment of eyeglasses, whose frame is intended to be folded up. In this case, the bridge 3 contains a central zone 8 of reduced thickness, and the bar 4 has a central zone of reduced thickness 9. Each of the temples 6 also contains a central zone 10 of reduced thickness.

It is thus possible first to fold up the two temples 6 over themselves by pivoting around the zones 10 of reduced thickness, and then to fold the frame over itself by pivoting around the zones 8,9 of reduced thickness.

As is apparent from the above, the present invention brings about a great improvement in the existing technique by providing an eyeglass frame using components made of shape memory alloy, which possess excellent deformability, are not subject to the usual risk of breaking after a certain number of deformations, can be directly welded or soldered to the other components of the eyeglasses made of a conventional alloy, and can be folded without the use of a hinge, which limits the number of components of such a frame.

It is obvious that the present invention is not limited to the embodiments of this frame which are described above as examples; on the contrary, it also encompasses all variants. Thus, the bridge, made of a shape memory alloy, could be directly attached to the lenses, and the temples, made of a monocrystalline shape memory alloy, could be attached either directly to the lenses or to the hinges, which themselves are directly attached to the lenses.

What is claimed is:

1. A metal eyeglass frame comprising:

one of a temple, a bridge, and a bar, made of a monocrystalline shape memory alloy, said alloy being selected from one of a group of alloys based on Cu and Fe.

2. An eyeglass frame in accordance with claim 1, wherein:

said alloy is formed by one of a single crystallite and a plurality of crystallites separated by boundaries with weak disorientation.

3. An eyeglass frame in accordance with claim 1, wherein:

said shape memory alloy is selected from one of a group of alloys consisting of Cu—Al—Cu, Cu—Al—Ni, Cu—Al—Be, and Cu—Al—Mn.

4. An eyeglass frame in accordance with claim 1, wherein:

said shape memory alloy is selected from one of a group of alloys consisting of Fe—Mn—Si, Fe—Mn—Cr, and Fe—Mn—Cr—Si.

5. An eyeglass frame in accordance with claim 1, wherein:

said shape memory alloy has a transformation temperature (Af) between −100° C. and −20° C. from which martensite begins to be formed.

6. An eyeglass frame in accordance with claim 1, wherein:

said shape memory alloy is able to undergo superelastic deformation by 11%, between −40° C. and +80° C. without permanent strain.

7. An eyeglass frame in accordance with claim 1, wherein:

said one of said temple, said bridge, and said bar is formed from a wire of monocrystalline shape memory alloy with a cross section framable in a circle having a diameter less than 4 mm.

8. An eyeglass frame in accordance with claim 1, wherein:

said monocrystalline shape memory alloy is directly weldable to other components which form part of the frame and said other components are made of metal alloys commonly used in making eyeglasses.

9. An eyeglass frame in accordance with claim 8, further comprising:

eyewires directly welded to said temples.

10. An eyeglass frame in accordance with claim 8, further comprising:

a torsion bar directly welded to said temple;

an eyewire connected to said torsion bar.

11. An eyeglass frame in accordance with claim 1, wherein:

said monocrystalline shape memory alloy is directly weldable to non shape memory alloys.

12. An eyeglass frame in accordance with claim 1, wherein:

an eyewire is connected to said temple;

said one of said temple, said bridge, and said bar include reduced thickness zones, said reduced thickness zones being located in one of contact zone between said eyewire and said temple, a substantially midlength position of said temple, a substantially middle position of said bridge, and a substantially middle position of said bar.

13. An eyeglass frame in accordance with claim 1, further comprising:

a lens directly attached to said bridge, said lens being one of directly attached to a hinge which is directly attached to said temple, and directly attached to said temple.

14. An eyeglass frame in accordance with claim 1, wherein:

said one of said temple, said bridge, and said bar have zones subjected to conventional thermomechanical treatment to change a behavior of said alloy from a superelastic behavior to a plastic behavior for adjustment of said one of said temple, said bridge, and said bar.

15. A metal eyeglass frame comprising:

one of a temple, a bridge, and a bar, made of a shape memory alloy, said shape memory alloy being selected from one of a group of alloys consisting of Fe—Mn—Si, Fe—Mn—Cr, and Fe—Mn—Cr—Si.

16. An eyeglass frame in accordance with claim 15, wherein:

said shape memory alloy is monocrystalline.

17. An eyeglass frame in accordance with claim 15, wherein:

said alloy is formed by one of a single crystallite and a plurality of crystallites separated by boundaries with weak disorientation.

18. An eyeglass frame having at least a portion thereof fabricated from a monocrystalline shape memory alloy, said alloy being selected from one of a group of alloys based on Cu and Fe.

19. A metal eyeglass frame comprising:

one of a temple, a bridge, and a bar, made of a shape memory alloy, said shape memory alloy being selected from one of a group of alloys consisting of Cu—Al—Cu, Cu—Al—Ni, Cu—Al—Be, and Cu—Al—Mn.

20. An eyeglass frame in accordance with claim 19, wherein:

said shape memory alloy is monocrystalline.

21. An eyeglass frame in accordance with claim 19, wherein:

said alloy is formed by one of a single crystallite and a plurality of crystallites separated by boundaries with weak disorientation.

* * * * *